United States Patent [19]

Fox

[11] Patent Number: 5,775,650
[45] Date of Patent: Jul. 7, 1998

[54] ROLL WHEEL STAND

[75] Inventor: Barry A. Fox, Overland Park, Kans.

[73] Assignee: The Babcock & Wilcox Company, New Orleans, La.

[21] Appl. No.: 771,558

[22] Filed: Dec. 20, 1996

[51] Int. Cl.[6] ................................................ B65D 19/44
[52] U.S. Cl. ................................ 248/176.1; 248/127
[58] Field of Search .......................... 248/176.1, 127, 248/346.02, 346.03

[56] References Cited

U.S. PATENT DOCUMENTS

| 1,177,365 | 3/1916 | Spalding | 248/127 |
| 1,932,951 | 10/1933 | Barieu | 249/127 X |
| 2,394,630 | 2/1946 | Mitchell | 248/127 X |
| 2,815,128 | 12/1957 | Kauttman | 248/176.1 X |
| 2,923,542 | 2/1960 | Clark et al. | 248/127 X |
| 4,013,256 | 3/1977 | Hill | 248/246.02 |
| 4,326,726 | 4/1982 | Dunchock | 248/176.1 X |
| 4,392,627 | 7/1983 | van den Brock | 248/176.1 |

Primary Examiner—Peter R. Brown
Attorney, Agent, or Firm—Daniel S. Kalka; Robert J. Edwards

[57] ABSTRACT

A roller wheel stand for providing long term storage for a roller wheel assembly and allowing scheduled rotation of the roller wheel assembly for proper lubrication includes a pair of vertically oriented channel members fastened to a pair of bottom members at substantially a right angle and spaced apart in an approximately a parallel relationship. The roller wheel stand is constructed to receive a roller wheel assembly for supporting it in a vertical orientation.

6 Claims, 3 Drawing Sheets

ROLL WHEEL STAND

BACKGROUND OF THE INVENTION

1. Field of the Invention

The present invention relates in general to a stand for supporting a wheel, and in particular to a stand for supporting a pulverizer roll wheel that provides a place for long term storage while still allowing the wheel to be rotated for keeping the bearings lubricated.

2. Description of the Related Art

Consumption of coal for the power industry requires the ability to grind coal to a fine particle size. One principle type of a coal pulverizer is a roller type pulverizer which employs three or more cylindrical roll wheels suspended from a driving arm that may either revolve on a horizontally positioned replaceable race or be fixed in stationary journals and held in position relative to a grinding ring which rotates in the pulverizer. One example of a roller type pulverizer is the Babcock & Wilcox type MPS pulverizer which is a roll-and-race pulverizer that utilizes three large contour grinding rolls or wheels equally spaced around the mill pitch diameter. These roll assemblies are attached through a connection to a triangular frame loading system that keeps the rolls from planitating within the housing.

The type MPS pulverizer size 89 which means an 89 inch pitch circle of the rolls where they contact the ring weighs 150 tons, is 27 feet high and is about 12 feet across. Each roll assembly weighs 10 tons. The pulverizer is driven by a 700 hp motor.

The use of large diameter rollers results in high installed volumes of wear material when combined with contoured shape, high utilization of this material and long wear life occurs. The large tires also permit feeding larger raw coal size. The roller-race design maintains mill capacity over the wear life.

Still, these roll wheels have a wear life and require replacement. Consequently, a need exists for a device which allows these large roll wheels to provide an adequate long term storage until they are required in the industry. Furthermore, this device should allow the roller wheel to be easily rotated to keep the bearings situated therein lubricated. Preferably, the storage device should provide rear accessibility and facilitate installation with standard lift equipment such as fork lifters found in most power plants and factories.

SUMMARY OF THE INVENTION

The present invention is directed to solving the aforementioned problems with the prior art as well as others by providing a roller wheel stand constructed to receive a roller wheel assembly and support it in a manner that allows the roller wheel to be rotated for keeping the bearings lubricated while in long term storage. The roller wheel stand according to the present invention provides rear accessibility and facilitates installation into a pulverizer with standard forklift equipment.

One aspect of the present invention is to provide a roller wheel stand which is suitable for placing the roller wheel assembly in long term storage.

Another aspect of the present invention is to provide a roller wheel stand which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENTS

Figure 1:
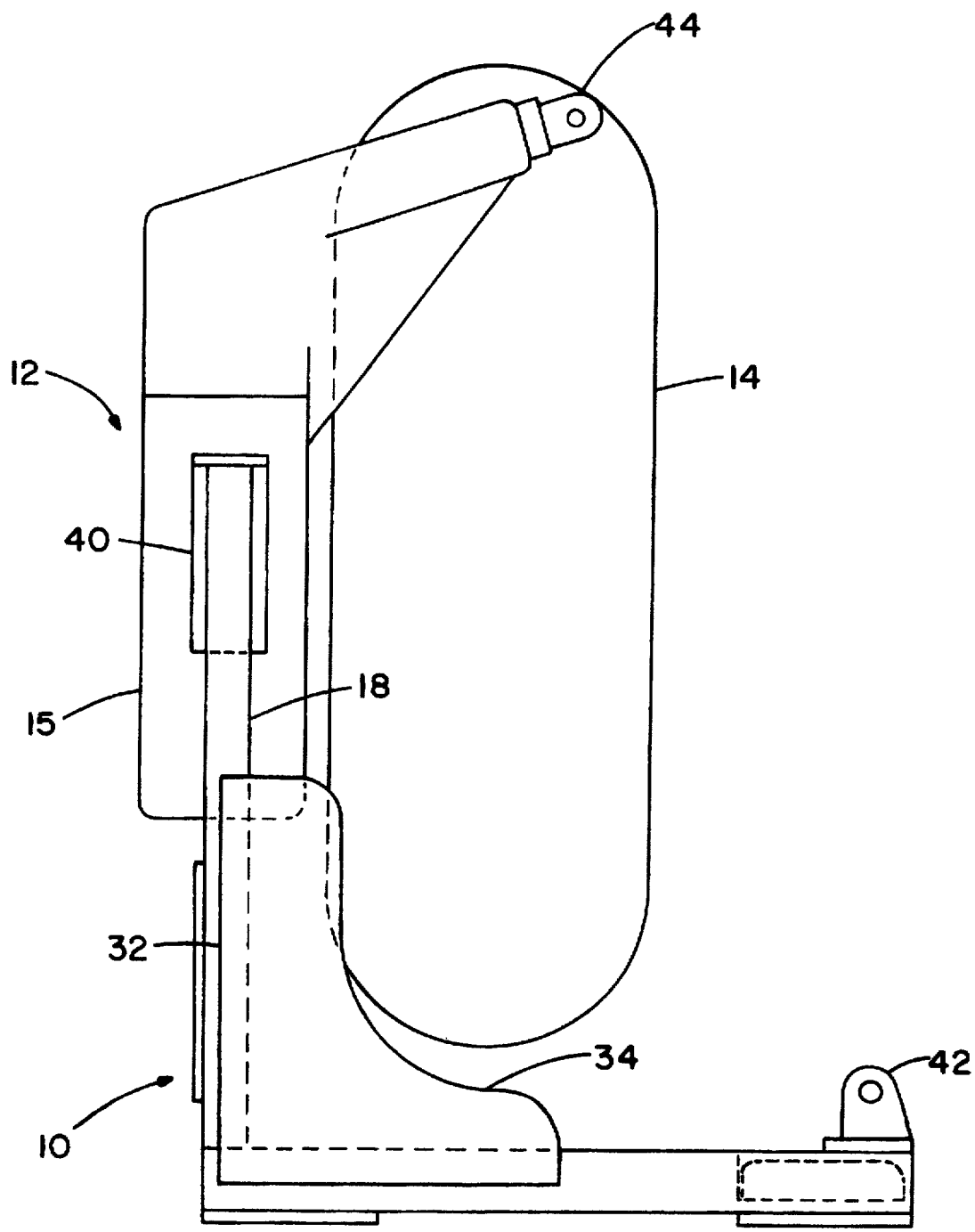
FIG. 1 is a side view illustrating the stand according to the present invention with a roller wheel assembly in place.

Referring to the figures where like numerals designate like or similar features throughout the several views, and in particular to FIG. 1, there is shown generally depicted (10) a roll wheel stand according to the present invention. In FIG. 1, a roller wheel assembly (12) is positioned therein so as to provide a place for long term storage as well as allowing the roller wheel (14) the ability to rotate which keeps the bearing lubricated. The roller wheel assembly (12) includes a triangular frame loading system (15) which is known in the art for coal pulverizers.

Figure 2:
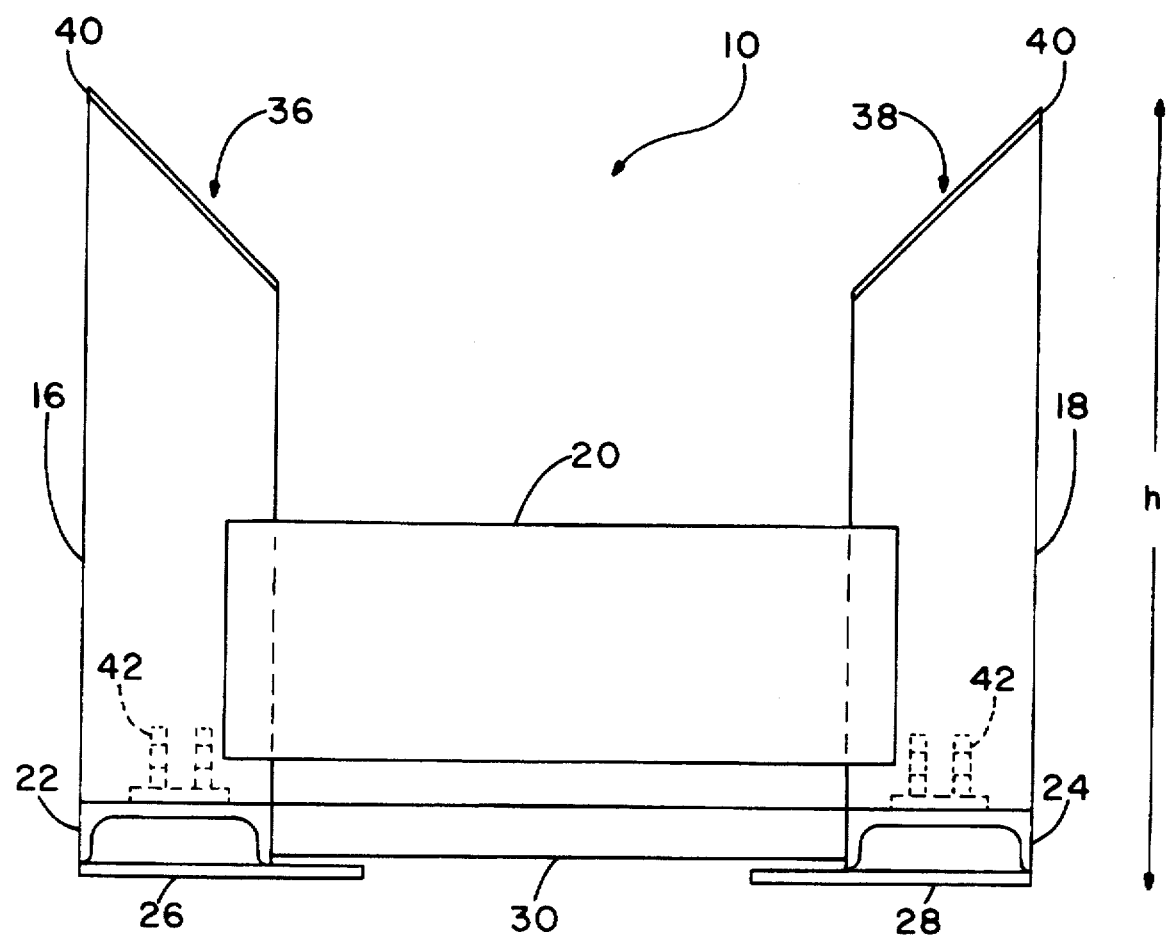
FIG. 2 is an end view of the roller wheel stand according to the present invention.
Figure 3:
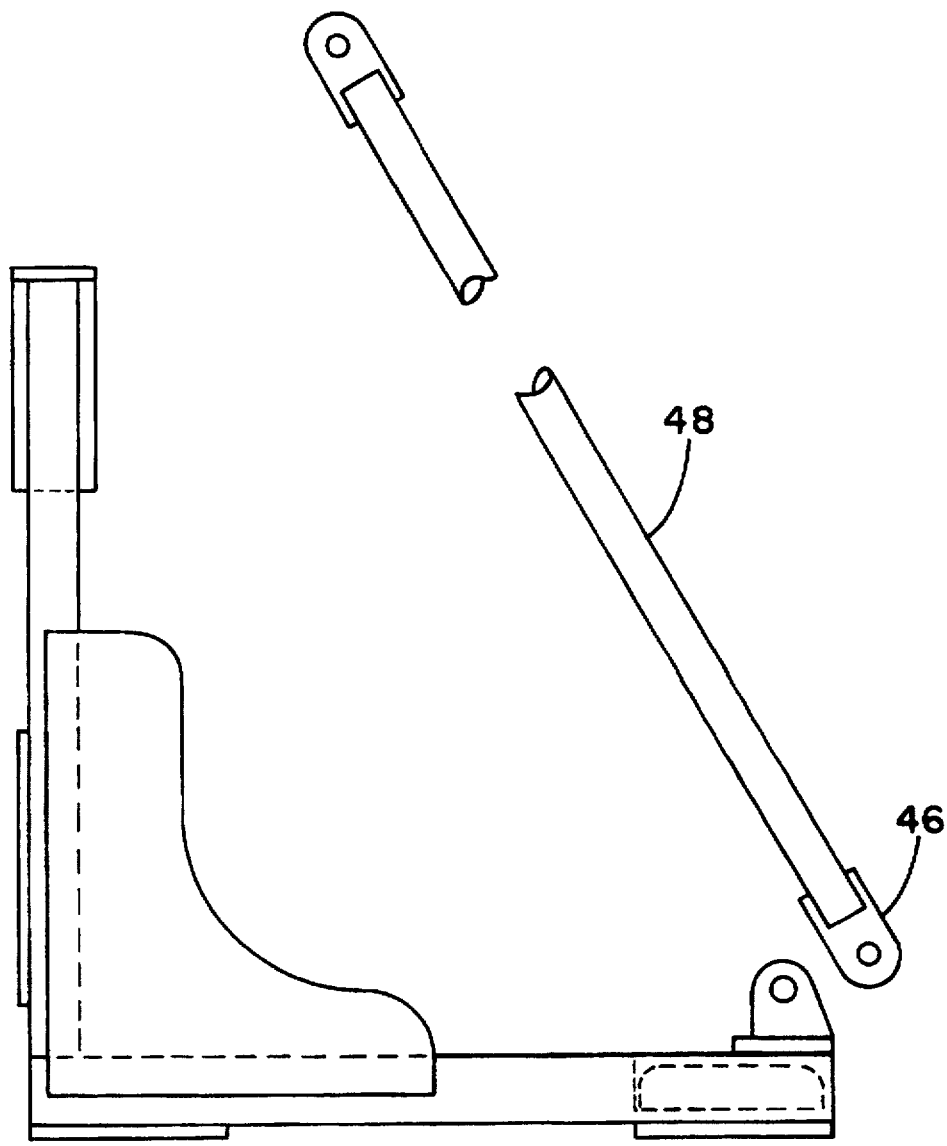
FIG. 3 is a side view of the roller wheel stand according to the present invention without the roller wheel assembly in place.

Referring next to FIG. 2, there is shown an end view of the roller wheel stand (10) according to the present invention without the roller wheel assembly (12) positioned therein. The roller wheel stand (10) comprises two channel members (16), (18) situated substantially parallel to each other and vertically oriented. Channel members (16), (18) are connected with one or more cross members (20). Each channel member (16), (18) is attached to a bottom channel member (22), (24) respectively, at approximately a right angle as shown in FIGS. 1 and 3. The bottom channel members (22) and (24) are positioned with the channel pointing in a downward direction so as to be adapted to receive the forks from a forklift (not shown). A support plate (26), (28) is fastened at each end of the bottom channel members (22), (24) respectively. The support plates (26), (28) provide for an even distribution of weight from the heavy roller wheel assembly while in storage and also facilitate lifting and stability during transportation. At least two cross members (30) positioned at the front and at the back of the bottom members (22), (24) rigidly hold the members in shape and provide the necessary support. A side plate panel (32) is fastened on the outside side of channel member (18) and the outside side of channel member (24) at the corner where they are connected. This also provides additional support for the roller wheel stand (10). The side plate panel (32) is preferably somewhat triangular with side (34) being cut in a somewhat semi-circular shape to accommodate the roller wheel (14). Similarly, a second side plate panel (32) is provided on the outside side of channel member (16) and bottom member (22) in the same manner.

The vertical channel members (16), (18) have a distal end (36), (38) that is cut at an angle which is selected to receive the triangular portion of the triangular frame loading system (15) of the roller wheel assembly (12). This angle is approximately 45° tapered inwardly towards the center of the roller wheel stand as best seen in FIG. 2. A top plate (40) is mounted on each of the vertical channel members (16), (18) to provide additional support for bearing the weight of the triangular portion of the triangular frame loading system (15) of the roller wheel assembly (12). The vertical channel members (16), (18) and the bottom members (22), (24) are constructed in a spaced part relationship in a predetermined manner to accommodate the triangular portion (15) of the roller wheel assembly (12) with a vertical height that allows the roller wheel (14) to freely rotate as it sits in the roller wheel stand (10). Also, the bottom members (22), (24) are of a sufficient length to ensure stability of the roller wheel stand once the roller wheel assembly is positioned therein.

For illustrative purposes, the following dimensions are provided for an MPS 89 roller wheel assembly. Approximately 4 feet 7 inches wide, outside from vertical to vertical legs (16, 18) with vertical leg raising 3 feet 7½ inches high with 45° support (36, 38) pads. Base channels (22, 24) being 4 feet 6½ inches long with 1 inch base plates below (26, 28). Includes two support assemblies (48) adjustable up to approximately 6 feet to receive several sizes of assemblies. All of the members are preferably made of steel having a width of at least 6 inches and a minimum thickness of approximately ½ inch. Of course, a lighter weight roller wheel would not require as heavy gauge steel.

Returning to FIG. 1 and shown in FIG. 3, brackets (42) are provided on the distal ends of both bottom members (22), (24). Also, a similar bracket in construction (44) is provided at the upper end of the roller wheel assembly (12). Bracket (42) is fastened to the bottom member either by welding or through fasteners such as bolts. Fastener (44) is preferably bolted to the upper end of the roller wheel assembly (12). Brackets (42), (44) are constructed with an aperture therethrough and in manner to receive a yoke (46) of a support arm (48) which includes a threaded portion therein (not shown) for supporting the roller wheel assembly in a vertical position. A mating aperture is provided in the yoke (46) to receive a bolt or a pin at both ends of the support arm (48) for supporting the roller wheel assembly. It is envisionable that any jacking means such as a hydraulic cylinder or mechanical jack is suitable for the supporting purpose of support arm (48).

In the above manner, the roller wheel stand according to the present invention allows for easy loading and unloading of the stand with the roller wheel assembly safely positioned therein. In addition to providing a suitable place for long term storage for replacement roller wheel assemblies, the roller wheel stand (10) allows for scheduled rotation of the roller wheel assembly so as to properly lubricate the seals and bearing contained within the roller wheel assembly.

While specific embodiments of the present invention have been shown and described in detail to illustrate the application of the principles of the invention, it will be understood that the invention may be embodied otherwise without departing from such principles.

I claim:

1. An apparatus which holds a roller wheel assembly, the roller wheel assembly comprised of a roller wheel supported by a triangular frame, comprising:

a pair of vertically oriented channel members spaced apart in a predetermined manner, each of said vertically oriented channel members having a distal end that is angled inwardly so as to receive a triangular portion of the triangular frame of a roller wheel assembly;

a pair of bottom members fastened to said vertically oriented channel members, said bottom members being situated substantially at a right angle to said vertically oriented members with each of said vertically oriented channel members connected to said bottom members in a spaced apart relationship approximately parallel to each other and connected to each other with a plurality of cross members, wherein said apparatus is constructed to receive a roller wheel assembly and position it in a vertical arrangement for providing storage and allowing the roller wheel to rotate freely.

2. An apparatus as recited in claim 1, further comprising a top plate fastened to each angled end of said vertically oriented channel members.

3. An apparatus as recited in claim 2, further comprising a side plate fastened on an outside edge of each of said vertically oriented channel members where it connects to said bottom member.

4. An apparatus as recited in claim 3, wherein each of said side plates includes semi-circular edge facing the roller wheel.

5. An apparatus as recited in claim 4, further comprising a bracket connected to a distal end of each bottom member, said bracket being constructed to receive and engage a yoke end of a support arm for rigidly supporting the roller wheel assembly therein.

6. An apparatus as recited in claim 5, further comprising a support plate fastened to each end of said bottom members to facilitate lifting and supporting the roller wheel assembly.

* * * * *